No. 881,665. PATENTED MAR. 10, 1908.
R. M. CORCORAN.
JOINT WIPING APPARATUS.
APPLICATION FILED JUNE 19, 1907.

3 SHEETS—SHEET 1.

Witnesses:
A. L. Lord
W. R. Mann

Inventor,
Richard M. Corcoran,
By Bates, Fouts & Hull,
Attorneys.

No. 881,665. PATENTED MAR. 10, 1908.
R. M. CORCORAN.
JOINT WIPING APPARATUS.
APPLICATION FILED JUNE 19, 1907.
3 SHEETS—SHEET 2.
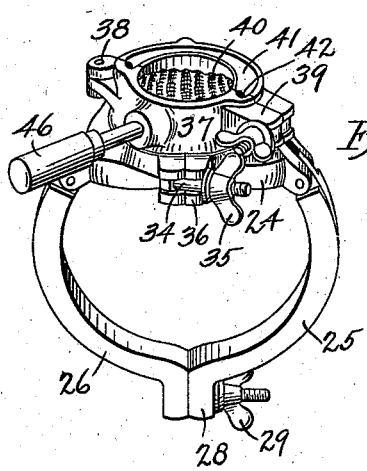
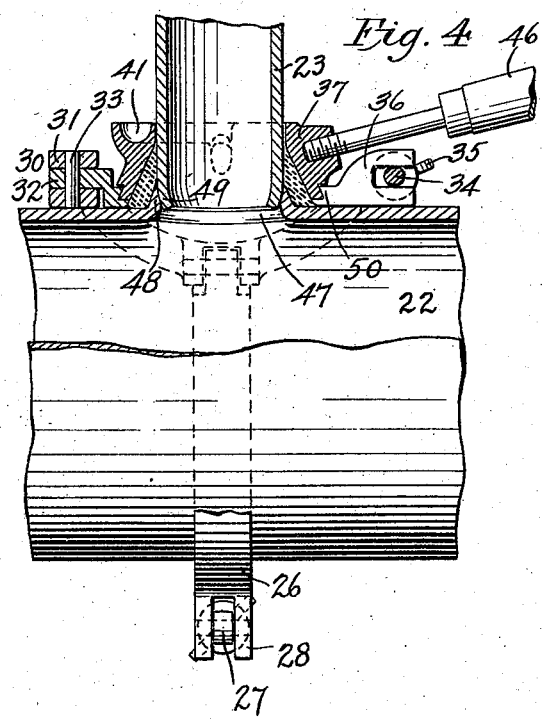
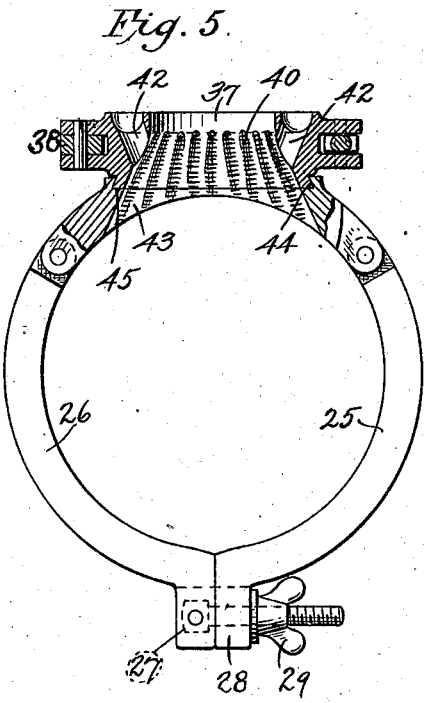
Witnesses:
A. L. Lord
W. R. Mann
Inventor,
Richard M. Corcoran
By Bates, Fouts & Hull,
Attorneys

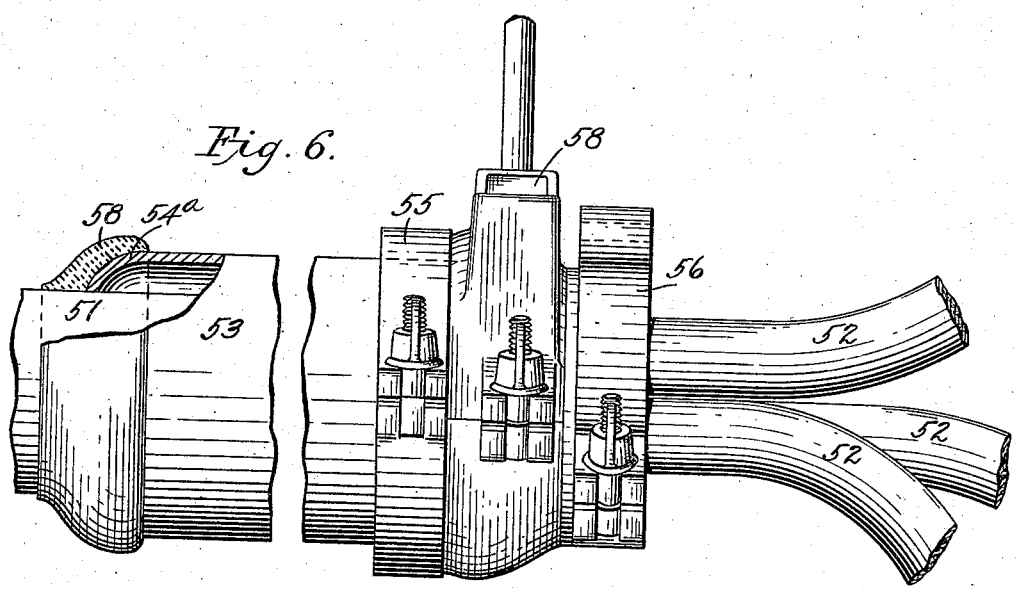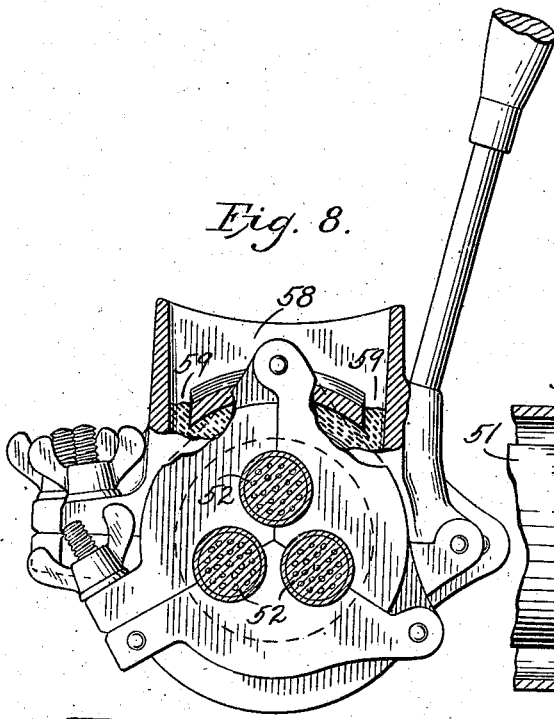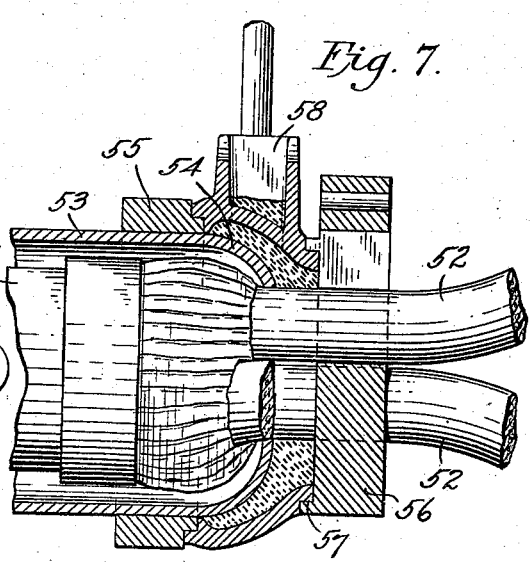

UNITED STATES PATENT OFFICE.

RICHARD M. CORCORAN, OF CLEVELAND, OHIO.

JOINT-WIPING APPARATUS.

No. 881,665.        Specification of Letters Patent.        Patented March 10, 1908.

Application filed June 19, 1907. Serial No. 379,711.

*To all whom it may concern:*

Be it known that I, RICHARD M. CORCORAN, a citizen of the United States, residing at Cleveland, in the county of Cuyahoga and State of Ohio, have invented a certain new and useful Improvement in Joint-Wiping Apparatus, of which the following is a full, clear, and exact description, reference being had to the accompanying drawings.

My invention relates to joint formers, particularly to the type of joint formers shown in my Patent No. 801,222 issued Oct. 10, 1905, and has for one of its objects to improve such formers in the matter of distribution of the solder or joint-wiping material to the objects on which joints are to be wiped.

More especially, it has for its object to render devices of this character capable of operation in connection with a line of pipe or cable which may be arranged at any angle, either horizontal or vertical or intermediate of such positions; also to provide specific forms of such devices that may be employed for the purpose of wiping joints on branch pipe or cable connections.

Figure 1:
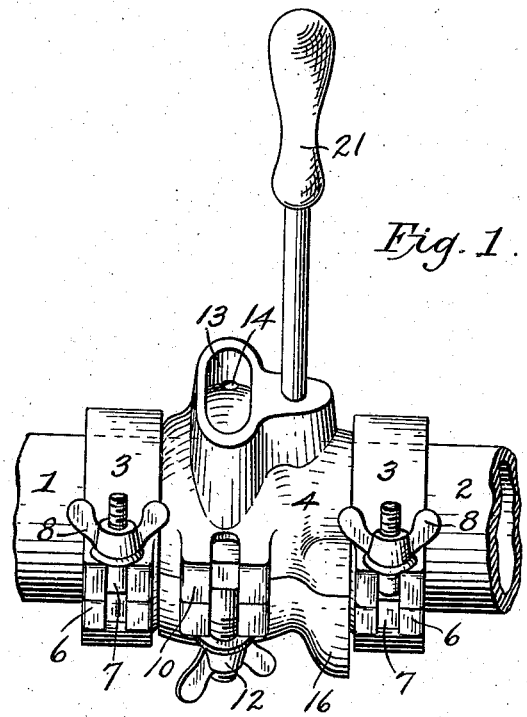
Figure 2:
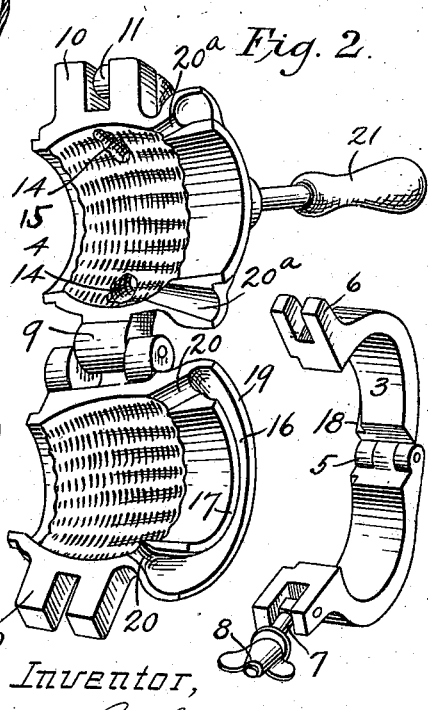

I accomplish these objects by means of the embodiments of my invention shown in the drawings, wherein Figure 1 represents a side elevation illustrating a device constructed in accordance with my invention applied to adjacent ends of pipes. Fig. 2 represents a perspective view of the device shown in Fig. 1, the various parts thereof being opened up. Fig. 3 represents a perspective view of a form of my device which is especially adapted for wiping joints on branch pipes, especially such pipes as lead from a trap. Fig. 4 represents a view, partly in section and partly in elevation, showing my device applied to a trap and to a branch pipe leading therefrom. Fig. 5 represents a view, partly in section and partly in elevation, of the device shown in the two preceding figures. Fig. 6 represents a side elevation of another form of my device, showing the same employed for the purpose of wiping a joint on a cable. Fig. 7 represents a longitudinal sectional view of the apparatus shown in Fig. 6 and Fig. 8 represents a view, partly in transverse section and partly in end elevation, of the same apparatus.

Referring to the form of my invention shown in Figs. 1 and 2, 1 and 2 represent the ends of two pipe sections which are to be united by means of a wiped joint. 3, 3 represent a pair of clamping rings which are adapted to be applied to the adjacent ends of the pipe sections and by and between which is rotatably supported the hollow joint-wiping body 4. As in the construction illustrated in my patent hereinbefore referred to, the rings 3 and body 4 are each composed of two sections hinged together to permit of their ready application to the joint and adjacent sections and are provided each with lugs and a pivoted bolt having a wing nut for engaging said lugs, whereby the rings and body may be firmly clamped in the desired position. 5 denotes the hinges of the rings, 6 the lugs, 7 the pivot bolt and 8 the wing nut thereon. 9 denotes the hinge of the body, 10 the lugs, 11 the pivot bolt and 12 the wing nut thereon.

It has been found, in the operation of devices of the character disclosed in my patent, that it is undesirable to have the molten solder or joint-wiping material which is introduced into the body impinge directly upon either or both pipe sections at the joint, as it tends to melt the metal and to weaken the same at the point in proximity to where the joint is to be wiped. I have therefore provided the body with a trough 13 projecting laterally therefrom and provided at its bottom with a pair of ports 14 which communicate with the interior of the body sufficiently close to the opposite sides thereof to enable the molten metal in the trough to flow to the bottom of the cavity in the body without first impinging upon the pipe sections. This produces a better distribution of the metal within the interior of the body, avoids the formation of air bubbles and also the weakening of the joint, which will be produced by the direct impingement of the molten metal on the same. As in the case of the construction shown in my patent, the interior of the body is provided with means whereby, on rotation of the body, the metal will be worked, said means consisting of corrugations 15 extending longitudinally of the interior of the body.

For the purpose of enabling me to operate upon pipes or cables in a vertical position, I provide, at one end of the body 4, another trough 16, and preferably between the flange 17 which engages a recess 18 in the adjacent clamping ring 3 and the outer circular flange 19. At opposite ends of this trough there are provided fractional ports 20, the other section of the body being provided with corresponding fractional ports 20ª, whereby, on applying the body to a joint, complete ports will be provided. In operating upon a vertical line of pipe or cable, ports 14 will be closed in any suitable manner and the trough 16 will be utilized for the reception and distribution of the molten metal. The metal introduced into the trough drops to the bottom of the cavity without impinging directly upon the pipe sections, with the advantages set forth in connection with the arrangement of ports 14. The operation of the device described will be similar to that of the device shown in my patent. The operator, after pouring the molten metal into the body, grasps the handle 21 and oscillates the body, thus working the metal around the joint. As soon as the metal begins to harden, he pushes the handle quickly in either direction and thus compacts the metal and tins and wipes the joint.

In Figs. 3, 4 and 5, I show a form of joint-wiper which is particularly adaptable for wiping joints on branch pipes, such as pipes leading from the trap. In Fig. 4, 22 denotes the body from which the branch pipe is to lead, as for instance, the body of the trap. 23 denotes the branch pipe between which and the body 22 a joint is to be wiped. For wiping this joint, I use a special form of clamp and hollow body. The clamp comprises a two-part ring 24 to opposite portions of which are pivoted the opposite members 25 and 26 of a ring adapted, with the ring 24, to embrace the body 22 and be firmly secured thereto. One of the aforesaid members, as 26, is provided with a pivoted bolt 27 adapted to be inserted between a pair of lugs 28 on the opposite member and having a wing nut 29. Members 25 and 26 are connected by the clamping ring 24 which surrounds the branch pipe 23 and in conjunction with which the joint-wiping body is adapted to be oscillated. Clamping ring 24 is made up of two members which are hinged together at 30, one of the members being provided with a pair of lugs 31 and the other with a single lug 32 interposed between the former lugs, there being a pin 33 extending through said lugs. The opposite members of ring 24 are connected by means of a bolt 34 pivoted to one of said members and having a wing nut 35 thereon and extending between a pair of lugs 36 provided on the other member. The lower surface of the ring 24 is concaved to fit the round surface of the body 22, as will appear more particularly from Figs. 2 and 5.

With ring 24, I employ the hollow body 37. This body is made of two sections hinged together at 38 and connected at their opposite portions at 39 by means of lugs and a pivoted bolt, as described in connection with the body shown in Figs. 1 and 2. The interior of the body is corrugated at 40 and said body is provided at the upper surface thereof with a semi-circular trough 41 provided with ports 42 at diametrically opposite portions thereof, said ports being preferably divided at the joint between the two sections and being partly in one section and partly in the other. From the points of connection of the ports with the interior of the body, the body flares downwardly and outwardly, as shown in Fig. 5, merging with the correspondingly flared cavity 43 in the clamping ring. The clamping ring 43 is provided with a recess 44 adapted to receive a ledge 45 on the lower end of the body and overhanging said ledge, whereby the body is held firmly in place when the wing nut 35 is tightened. The body is provided with an operating handle 46.

In forming a joint with the apparatus shown in Figs. 3 to 5, I first form a hole 47 in the body of the trap 22; then I flare the metal thereof outwardly, as at 48, thinning the outer edge of the flared portion. The branch pipe 23 is inserted in place, first flaring the lower end thereof inwardly, as at 49, to make a close fit between the same and the upper edge of 48 and provide an extended bearing on said edge. The body 37 is applied to pipe 23 and its parts clamped together by the wing nut. The upper clamping ring 24 is then applied to the body with the shoulder 50 engaging the lower end of said body and the parts of said upper clamping ring are secured together by means of wing nut 35. These members 25 and 26 are secured together around the trap 22. The interior of the body 37 and the chamber 43 provided in the clamping ring 24 form a chamber for the reception of the molten metal, which is poured into the trough 41 and is distributed through the ports 42 without impinging directly upon the joint formed between 23 and 22. The joint is then wiped as in the case of the preceding modification.

In Figs. 6, 7 and 8 I have shown a form of my device which is adapted for wiping joints on cables where the cable has been divided and branches lead therefrom in various directions. In this case I have shown my device as adapted to wipe a joint between the end of the sleeve which is applied to the body of the cable and the branches of the cable. 51 denotes the body of the cable from which branches 52 are to be led off. 53 denotes a sleeve which is applied to the body of the cable. One end of this sleeve, which is preferably of lead, is hammered down at 54 into engagement with the cable branches. The other end is hammered down onto the body of the cable sheath. After the strands of the cable have been divided and the branch cables spliced thereon, the sleeve 53 is slid into proper relation with the branch cables, the end 54 adjacent to such branches is beaten down around them and the opposite end 54ª is beaten down onto the cable sheath and a clamping ring 55 is applied to said sleeve, which is similar in construction to the clamping rings shown in Figs. 1 and 2. A clamping ring 56 is applied to the branches, said clamping ring being also made of two or more hinged parts, each part being provided with a fractional aperture for a cable branch. The clamping ring 56 is provided with a recess 57 on its inner face for the reception of the adjacent end of the joint-wiping body. The body in this case is given a special shape to enable it to fit the rings 55 and 56, the portion which abuts against ring 55 being of greater diameter than which abuts against ring 56. As in the case with the body shown in Figs. 1 and 2, it is provided with an elongated trough 58 having ports 59 whereby the molten metal introduced into the trough may be discharged at opposite sides of the interior of the body.

In making the joint between the sleeve 53 and the body of the cable, the end of the sleeve 54ª is beaten down into engagement with the sheath with which the cable is covered, and the joint thus formed is wiped, as shown at 58. The joint-wiping body used for making this joint is of the same general shape as that shown at the opposite end of the sleeve, being of greater diameter at one end than at the other, with clamping rings of corresponding size.

It will be understood that, if desirable, the joint-wiping bodies which are for use with the trap and the cable joints may be provided with two troughs to adapt them for use with horizontally or vertically extending branches.

By the forms of my invention disclosed herein, it will be apparent that I will be enabled to adapt the same to the varying contingencies which arise in connection with the art of joint-wiping and to form mechanically a perfect joint between the parts to be united.

Having thus described my invention, I claim:

1. An apparatus for wiping joints comprising a hollow body adapted by its rotation or oscillation to work the joint-wiping metal introduced thereinto, said body being provided with a trough or receptacle for supplying molten metal to the interior thereof, said trough or receptacle being provided with a pair of ports, said ports being arranged adjacent to opposite portions of the hollow body, substantially as specified.

2. An apparatus for wiping joints comprising a hollow body adapted to be applied to the joints and to be rotated or oscillated with respect thereto, said body having an internal chamber provided with means for engaging and working the metal introduced thereinto and having a pair of separated ports for the introduction of the molten metal thereinto, the ports being so located as to prevent direct impingement of the molten metal introduced therethrough upon the joint within the chamber, substantially as specified.

3. A joint-wiping apparatus comprising a hollow body adapted to be rotated or oscillated with respect to the sections to be united, said body being provided on its exterior with a trough, said trough having at opposite ends thereof ports communicating with the interior of the body, and means for mounting the body rotatably in relation to the sections to be united, substantially as specified.

4. In an apparatus for wiping joints, the combination of a pair of clamping members, one of said members comprising pivotally connected sections having a plurality of apertures therethrough, and a chambered body adapted to be applied to said members and to be rotated or oscillated with respect thereto, substantially as specified.

5. In an apparatus for wiping joints, the combination of a pair of clamping members, one of said members comprising a plurality of sections each having a fractional aperture therein and adapted, when united, to form one or more complete apertures, and a chambered body adapted to be applied to said members and to be rotated or oscillated with respect thereto, substantially as specified.

6. In an apparatus for wiping joints on cables, the combination of a pair of clamping members adapted to be applied respectively to a sleeve on the body of the cable and the cable branches, one of said members being provided with one or more apertures for cable branches, and a chambered body adapted to be applied to said members and to be rotated or oscillated with respect thereto, substantially as specified.

7. In an apparatus for wiping joints on cables, the combination of a sleeve of greater diameter than the cable with which it is to be employed and having a contracted end, a pair of clamping members one of which is adapted to be applied to said sleeve and the other to the cable, and a hollow body adapted to be applied to said members and to be rotated or oscillated with respect thereto, substantially as specified.

In testimony whereof, I hereunto affix my signature in the presence of two witnesses.

RICHARD M. CORCORAN.

Witnesses:
J. B. HULL,
S. E. FOUTS.